Feb. 2, 1926.

W. C. F. SCHRAMM 1,571,346

PROCESS OF FORMING MILLING CUTTERS

Filed May 24, 1921    3 Sheets-Sheet 2

Inventor
W. C. F. Schramm,
By Wayne B Wells
Attorney

Feb. 2, 1926.

W. C. F. SCHRAMM 1,571,346

PROCESS OF FORMING MILLING CUTTERS

Filed May 24, 1921   3 Sheets-Sheet 3

Inventor
W. C. F. Schramm,
By Wayne B Wells
Attorney

Patented Feb. 2, 1926.

1,571,346

UNITED STATES PATENT OFFICE.

WILLIAM C. F. SCHRAMM, OF HARTFORD, CONNECTICUT, ASSIGNOR TO PRATT & WHITNEY COMPANY, OF NEW YORK, N. Y., A CORPORATION OF NEW JERSEY.

PROCESS OF FORMING MILLING CUTTERS.

Application filed May 24, 1921. Serial No. 472,080.

*To all whom it may concern:*

Be it known that I, WILLIAM C. F. SCHRAMM, a citizen of the United States, residing at Hartford, in the county of Hartford and State of Connecticut, have invented certain new and useful Improvements in Processes of Forming Milling Cutters, of which the following is a specification.

My invention relates to processes of forming cutter blanks and particularly to processes of forming cutter blanks which are adapted to cut thread milling hobs.

One object of my invention is to form a milling cutter by a process that shall comprise a step of rotating a cutting wheel in engagement with a cutter blank in rotation to form a series of adjacent circumferential cuts on one face of each tooth of the blank and a step of forming a similar series of circumferential cuts on the opposite side of each tooth of the blank.

Another object of my invention is to form a milling cutter by a process which consists in rotating a cutting wheel in engagement with a rotating blank to effect a series of relieved cuts on one face of each tooth of the cutter blank, said series of cuts conforming to any desired angle relative to the plane of rotation of the cutter blank, and in changing the relative position of the wheel and the blank to form a similar series of cuts, conforming to any desired angle relative to the plane of rotation of the blank, on the opposite face of each tooth of the blank.

Another object of my invention is to rotate a cutting wheel in engagement with a cutter formed in accordance with the above indicated process to produce a relieved flat surface on each tooth between the side faces, said flat surfaces conforming to any desired angle relative to the plane of rotation of the cutter.

A further object of my invention is to form a milling cutter by a process which consists in rotating a cutter blank in engagement with a cutting wheel, in effecting relieving movements of the blank in conformity to the rotation of the blank, in effecting feeding movements of the cutting wheel along any predetermined angle relative to the plane of rotation of the cutter blank to form a series of relieved cuts on one face of each tooth of the blank, in changing the relative position of the wheel and the blank to effect a similar series of cuts on the opposite face of each tooth of the blank, and in changing the relative position of the wheel and the blank to effect a flat relieved surface on each tooth of the blank at any desired angle relative to the plane of rotation of the blank and between the side faces.

In finishing a milling cutter blank in accordance with my invention, two machines are preferably used if the milling cutter is adapted to cut hobs for sharp V-threads and three machines are preferably used if the finished cutter is adapted to cut hobs for U. S. standard threads. The two machines which are used for forming a cutter to cut hobs for sharp V-threads and the three machines which are used for forming a cutter to cut hobs with the U. S. standard thread are very similar in construction and perform somewhat similar functions. Two of the machines serve to grind and relieve opposite faces of the cutter teeth and the third machine serves to grind and relieve the peripheral face of the cutter teeth. The same movements are effected in each machine but in each case the relative position of the grinding wheel and cutter blank is changed.

The blank, before being finished in a machine or machines adapted to operate in accordance with my process, is fluted in any suitable milling machine and the teeth thus formed are relieved in the usual manner in a lathe. The blank is then hardened and tempered. The hardened and tempered blank is rotatably mounted on a slide which is preferably adapted to effect relieving movements in a horizontal plane. The cutting wheel is rotatably mounted on a second slide and is adapted to rotate in a plane perpendicularly located to the axis of rotation of the blank. The second slide, which carries the cutting wheel, is so mounted that it may be moved at any desired angle relative to the plane of rotation of the blank. The second slide is set to cut the teeth of the blank to any predetermined angle and is operated to effect feeding movements of the cutting wheel relative to the cutter blank.

Although I have described my process by means of machines having grinding wheels operating on cutter blanks, it is apparent the grinding wheels may be replaced by milling cutters if so desired. Moreover, it is apparent that one machine may be varied to perform more than one operation on the cutter blank.

In the copending application of William C. F. Schramm and Carl Schramm, Serial No. 472,033, filed May 24, 1921, is disclosed in detail machines for forming a milling cutter in accordance with my invention.

Figure 1:
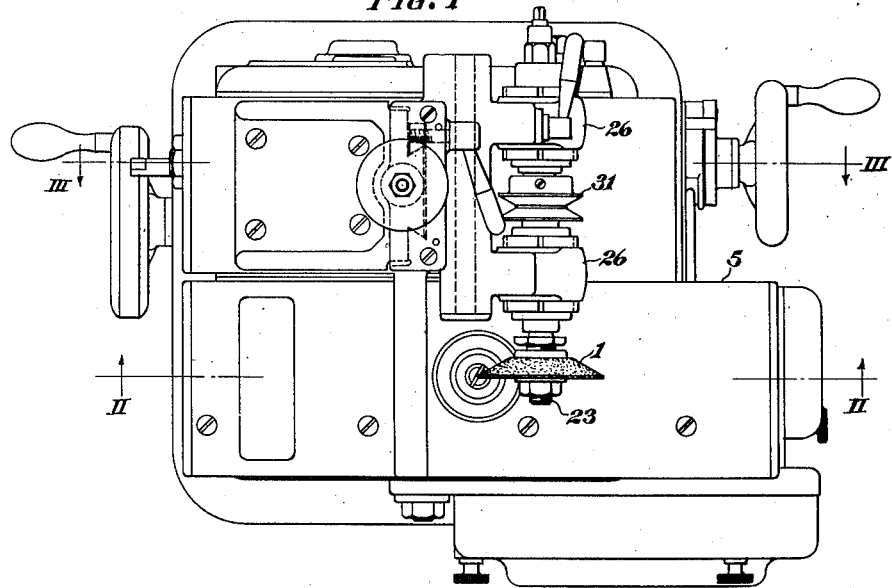
Figure 1 is a plan view of the machine adapted to form one face of each blank tooth in accordance with my process.
Figure 2:
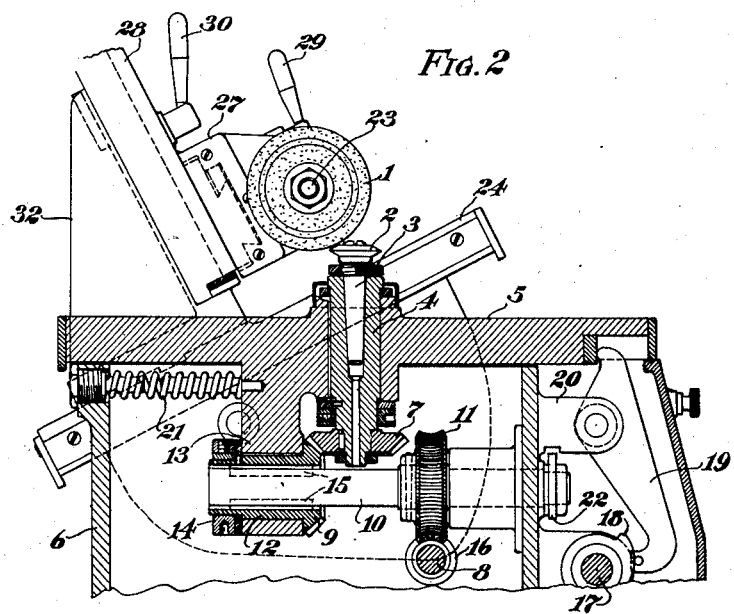
Fig. 2 is a side elevational view partially in section along the line II—II of Fig. 1.
Figure 3:
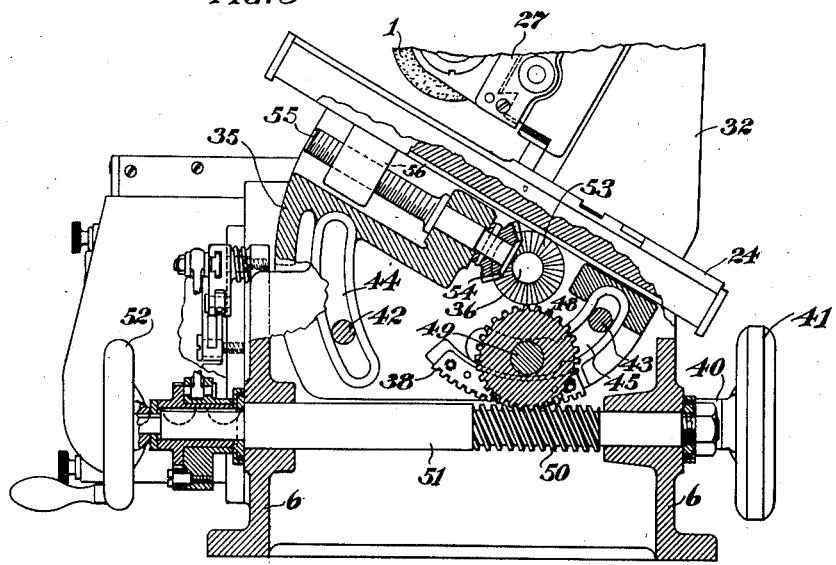
Fig. 3 is a side elevational view partially in section along the line III—III of Fig. 1.

Referring to the drawings, Figs. 1, 2 and 3 exemplify a machine for forming the sides of the cutter teeth in accordance with my invention. A cutting wheel 1 is so rotated relative to a rotating cutter blank 2 as to effect a series of circumferential cuts on each tooth of the blank. Preferably, the cutter blank 2 effects relieving movements relative to the wheel and the wheel effects feeding movement relative to the blank. It is to be understood, however, that my invention is not limited to effecting relieving movements by the cutter blank and effecting feeding movements by the cutting wheel. The cutting wheel is preferably a grinding wheel but, if so desired such wheel may be any suitable milling cutter.

The cutter blank 2 is mounted on a center pin 3 which is carried by a spindle 4. The spindle 4 is rotatably supported on a slide 5 which is adapted to effect reciprocating movements in a horizontal plane on the frame 6 of a machine. The spindle 4 carries a beveled gear wheel 7 which is connected to a power shaft 8 through a bevel gear wheel 9, a worm shaft 10 and a worm wheel 11. The bevel gear wheel 7 meshes with the bevel gear wheel 9 which is mounted on a worm shaft 10. The bevel gear wheel 9 is provided with a cylindrical portion 12 which is rotatably mounted in a projecting portion 13 on the slide 5. Such projecting portion 13 also serves to support one end of the worm shaft 10. A suitable collar 14 is fixed to the cylindrical portion 12 of the bevel gear wheel 9 to prevent any axial movement of the gear wheel relative to the slide 5. Key members 15 are provided for compelling the gear wheel 9 to rotate with the shaft 10. The worm wheel 11 is pinned to the worm shaft 10 in any suitable manner and meshes with a worm member 16 which is mounted on the power shaft 8.

The power shaft 8 is connected in any suitable manner (not shown) to a cam shaft 17. The cam shaft 17 carries a cam member 18 which serves to effect relieving movements of the slide 5. A lever 19 is pivotally mounted on lugs 20 which project from the frame 6 of the machine. The lever 19 is operated by the cam member 18 to effect reciprocatory movement of the blank slide 5. A spring member 21, which is located between the frame 6 of the machine and the projecting portion 13 of the slide 5, serves to hold the slide in engagement with one end of the lever 19. Inasmuch as the blank 2 and the cam shaft 17 are connected to the same source of power, it is apparent the relieving movements of the slide 5 are effected in timed relation to the rotation of the blank. A second cam member 22 is mounted on the worm shaft 10 for effecting feeding movements of the wheel 1 in a manner to be hereinafter set forth.

The cutting wheel 1 is mounted on a shaft 23 which is supported on a wheel slide 24. By varying the position of the wheel slide 24, the cutting wheel 1 may be fed along any predetermined angle relative to the plane of rotation of the cutter blank 2. The shaft 23 is supported by suitable bearings 26 which in turn are mounted on an auxiliary slide 27. The slide 27 in turn is mounted on a second auxiliary slide 28. The auxiliary slides 27 and 28 are moved perpendicularly to each other and serve to adjust the cutting wheel 1 into operative relation to the cutter blank 2. Set screws, which are respectively operated by the handles 29 and 30, are provided for locking the auxiliary slides 27 and 28 in any set position. A pulley 31, which is connected to any suitable source of power, is located between the two bearings 26 for operating the shaft 27 and the cutting wheel 1.

A bracket 32, which is mounted on the wheel slide 24, serves to support the auxiliary slide 28. The wheel slide 24 is mounted on an auxiliary frame 35 which is given a movement of rotation in order to set the slide 24 for movement at any desired angle relative to the plane of rotation of the cutter blank 2. The auxiliary frame 35 is mounted in any suitable manner (not shown) on a shaft 36 which is supported by the frame 6 of the machine. The auxiliary frame 35 carries a worm segment 38 which meshes with a worm member on a shaft 40. The shaft 40 is supported in the frame 6 and is operated by a hand wheel 41. It is apparent by operating the hand wheel 41, that the angular position of the wheel slide 24 is changed relative to the plane of rotation of the cutter blank 2. Two bolts 42 and 43, which pass through arcated slots 44 and 45 are provided for locking the auxiliary frame 35 in any set position.

A worm wheel 48, which is mounted on a shaft 49, is connected in any suitable manner (not shown) to the shaft 36 which supports the auxiliary frame 35. The worm wheel 48 meshes with a worm member 50 which is mounted on a shaft 51. The shaft 51 is mounted in the frame 6 of the machine and carries a hand wheel 52. The shaft 51 is operated in any suitable manner by means of the cam member 22 which is mounted on the worm shaft 10 and is preferably operated in the manner disclosed in the above mentioned application Serial No. 472,033. The shaft 36, which is operated in accordance with the operation of the shaft 51, carries a bevel gear 53 which meshes with a second bevel gear 54. The bevel gear 54 is pinned to a screw shaft 55 which is mounted on the auxiliary frame 35. The screw shaft 55 engages a nut 56 which is attached to the wheel slide 24. Thus, upon rotation of the screw shaft, the position of the slide 24 on the auxiliary frame 35 is varied. The cam member 22 is operated in accordance with the rotation of the cutter blank 2, and, inasmuch as such cam member controls the movement of the shafts 51 and 36, it is apparent the feeding movements of the slide 24 and the wheel 1 are effected in accordance with the rotation of the blank 2. The slide 24 and the wheel 1 may be fed at will by means of the hand wheel 52.

In a machine constructed as above set forth, the wheel 1 is moved into engagement with the rotating blank 2. Preferably, the wheel 1 is a grinding wheel having the outside cutting edge radially disposed with respect to the cutter blank 2. During the rotation of the cutter blank, the cam member 18 serves to effect relieving movements of the blank slide 5 and the cutter blank 2. Thus, the blank 2 is so reciprocated relative to the grinding wheel 1 as to effect a relieving cut on each tooth for each rotation of the blank 2. The machine is preferably so set that the cam member 22 effects a feeding movement of the grinding wheel 1 relative to the blank 2 for each rotation of the blank 2. The wheel slide 24 is so set as to effect feeding movements of the wheel 1 along any predetermined angle relative to the plane of rotation of the blank 2. Thus, a series of relieved cuts, which conform to any desired angle relative to the plane of rotation of the cutter blank 2, are made on one side of each tooth of the blank.

Figure 4:
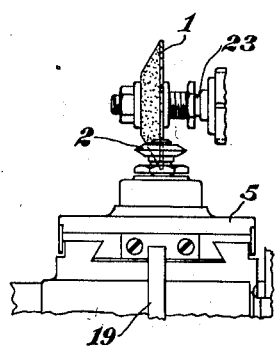
Fig. 4 is a diagrammatic view of a modified machine for forming the opposite face of each tooth in accordance with my process.

The opposite faces of the teeth on the cutter blank are preferably formed by a similar machine wherein the relative position of the cutter blank and the grinding wheel is reversed. Moreover, the direction of rotation of the cutter blank 2 should be reversed. Inasmuch as the machine for forming the opposite faces of the teeth is similar in construction and operation to the machine disclosed in Figs. 1, 2 and 3, it is deemed unnecessary to describe such a machine in detail. In Fig. 4 of the drawings, the reversed position of the grinding wheel 1 and the cutter blank 2 is illustrated. In such figure like parts to those shown in Figs. 1, 2 and 3 are indicated by similar reference characters. The grinding wheel 1 is so positioned relative to the cutter blank 2 that the front cutting face is last to engage each tooth of the blank and accordingly effect the finishing cut. The relieving movements and the feeding movements of the machine, a portion of which is illustrated in Fig. 4 of the drawings, are effected in the same manner as in the machine disclosed in Figs. 1, 2 and 3.

A cutter which has been formed by the machines disclosed in Figs. 1, 2, 3 and 4 is adapted to cut either sharp V-threads or to form a thread milling hob for cutting sharp V-threads. In case it is desired to form a milling cutter to cut the U. S. standard threads, a further step is required to form flat surfaces on each tooth of the cutter between the side faces. The machine for effecting the step of forming flat surfaces on the teeth of the blank is shown in Figs. 5 and 6 of the drawings.

Figure 5:
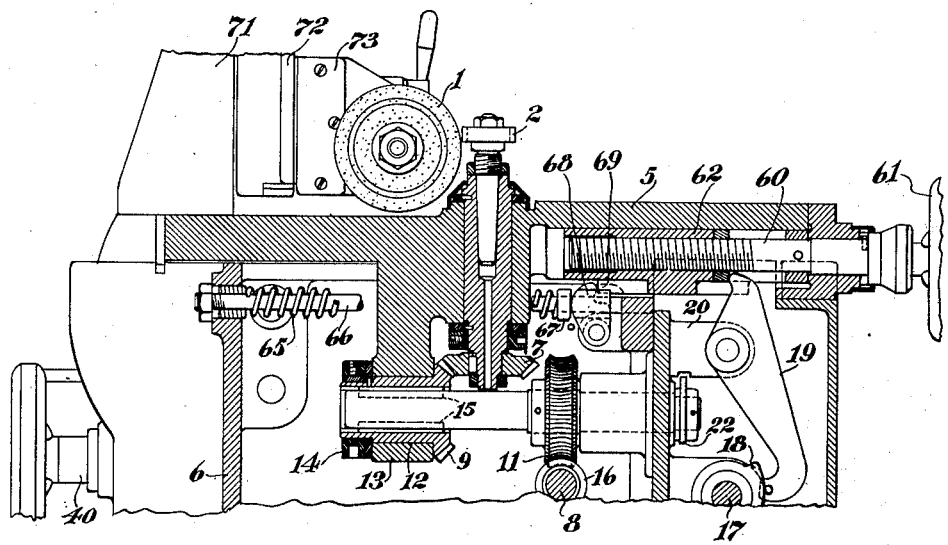
Fig. 5 is a partial side elevational view of a modified machine for grinding the peripheral face of the teeth in accordance with my process.
Figure 6:
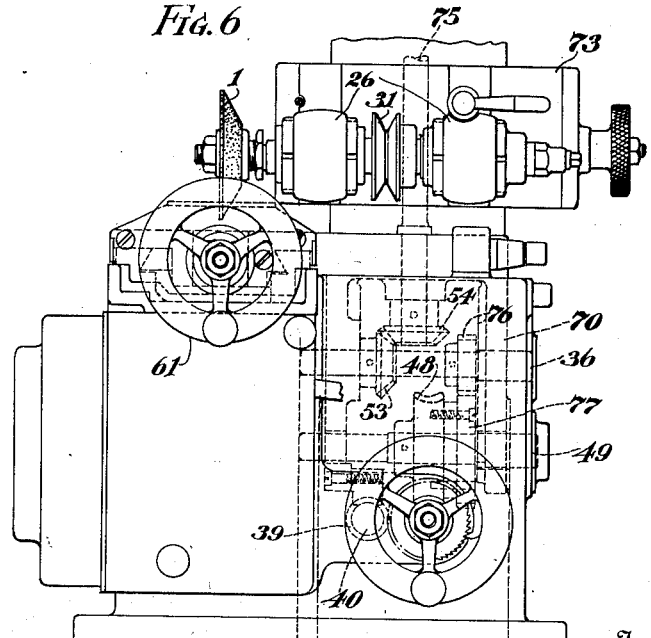
Fig. 6 is a partial front elevational view of a machine shown in Fig. 5.

The machine illustrated in Figs. 5 and 6 is very similar to the machine illustrated in Figs. 1, 2 and 3 of the drawings and like parts will be indicated by similar reference characters. Preferably, in a machine for grinding and relieving the teeth of a cutter blank when U. S. standard thread hobs are to be cut, the blank slide 5 carries a screw shaft 60 for adjusting the position of the cutter blank 2 relative to the grinding wheel 1. The screw shaft 60 is controlled or operated by a hand wheel 61. The screw shaft 60 engages a nut 62 which is mounted on the blank slide 5. The nut 62 is engaged by the lever 19. The lever 19, as heretofore set forth, is operated by the cam member 18 to reciprocate the slide 5. The nut 62 and the slide 5 are held by means of a spring member 65 in such position that the nut engages the end of the lever 19. The spring member 65 is mounted on a rod 66 and is disposed between the frame 6 and a loose collar 67. The loose collar 67, which is carried by the rod 66, engages a pivotally mounted lever 68. The lever 68 engages a block 69 which is attached in any suitable manner to the nut 62. The slide 5, in the machine shown in Figs. 5 and 6, effects relieving movements in the same manner as the slide shown in machine illustrated in Figs. 1, 2 and 3. However, in the machine shown in Figs. 5 and 6 the hand wheel 61 may be operated for adjusting the cutter blank in a horizontal plane relative to the grinding wheel 1. The position of the cutter blank 2 is also raised somewhat above the slide 5 in order to permit the movement of the grinding wheel in a vertical plane past the cutter blank.

An auxiliary frame 70 is mounted on the shaft 36 in the same manner as the auxiliary frame 35 is supported on a smaller shaft in the machine illustrated in Figs. 1, 2 and 3. The auxiliary frame 70 supports a bracket 71 which in turn supports a wheel slide 72. The wheel slide 72 carries an auxiliary slide 73 which in turn carries the grinding wheel 1. The angular position of the auxiliary frame 70 and the slide 72 relative to the plane of rotation of the cutter blank 2 is varied by means of the shaft 40. Generally, the auxiliary frame 70 is so set that the slide 72 effects a movement perpendicularly to the plane of rotation of the cutter blank. However, in case a spiral hob is to be cut, the position of the frame 70 must be so changed that the slide 72 is operated at some predetermined angle other than a right angle relative to the plane of rotation of the cutter blank 2.

A screw shaft 75 is mounted on the auxiliary frame 70 and engages any suitable nut (not shown) on the slide 72 in order to effect movement of the slide in accordance with the rotation of the shaft 75. The shaft 75 carries the bevel gear wheel 54 which meshes with the bevel gear wheel 53 on the shaft 36. The shaft 36 carries a pinion 76 which meshes with a gear wheel 77 which is mounted on the shaft 49. The feeding movements of the slide 72 are effected in the same manner as the feeding movements of the slide 24 in the machine disclosed in Figs. 1, 2 and 3 of the drawings.

In the machine disclosed in Figs. 5 and 6, the cutter blank 2 is rotated in engagement with the grinding wheel 1 and the slide 5 is reciprocated in timed relation to the blank rotation to effect relieving movements of the blank. Moreover, the cutting wheel 1 is so fed relative to the cutter blank as to form a relieved flat surface on each tooth between the side faces. Such flat surfaces are formed by a series of relieved cuts which conform to any desired angle relative to the plane of rotation of the cutter blank. In forming a cutter blank for cutting U. S. standard threads, a series of relieved grinding cuts are taken on one side of each tooth of the cutter blank, a like series of relieved grinding cuts are taken on the opposite faces of each tooth of the cutter blank, and finally, a series of relieved grinding cuts are taken on the periphery of the teeth to form flat surfaces between the side faces of the teeth.

Modifications in the processes and in the arrangement of steps may be made within the spirit and scope of my invention and such modifications are intended to be covered by the appended claims.

What I claim is:

1. The process of forming a milling cutter from a blank which consists in rotating the blank, in rotating a cutting wheel in engagement with the rotating blank, in effecting relative movement between the blank and the wheel during rotation of the blank to produce a series of circumferential cuts on one face of each tooth of the blank, and in reversing the relative position of the blank and the wheel to produce a similar series of cuts on the opposite face of each tooth of the blank.

2. The process of forming a milling cutter from a blank which consists in rotating the blank, in rotating a cutting wheel in engagement with the rotating blank, in effecting linear movement of the blank toward the wheel during rotation of the blank to produce a series of cuts on one face of each tooth of the blank, in reversing the position and rotation of the blank, and in reversing the position of the wheel to obtain a series of cuts on the opposite face of each tooth of the blank.

3. The process of forming a milling cutter from a blank which consists in rotating the cutter blank, in rotating a cutting wheel in engagement with the rotating blank, in effecting relative movement between the blank and the wheel to produce a series of cuts on one face of each tooth of the blank, in reversing the position and rotation of the blank, in reversing the position of the wheel to obtain a series of cuts on the opposite face of each tooth of the blank, and in effecting relative movement between the blank and the wheel to cut away the outside edge of the teeth by a series of cuts.

4. The process of forming a milling cutter from a blank which consists in rotating the blank, in rotating a cutting wheel in engagement with the blank, in effecting relative movement between the blank and the wheel to produce a series of circumferential cuts on one face of each tooth of the blank, in reversing the relative position of the blank and the wheel to produce a series of cuts on the opposite face of each tooth of the blank, and in effecting relative movement between the blank and the wheel to cut away the outside edge of each tooth by a series of adjacent cuts.

5. The process of forming a milling cutter from a blank which consists in rotating the blank, in rotating a cutting wheel in engagement with the blank, in effecting feeding movements of the wheel relative to the blank along any predetermined angle relative to the plane of rotation of the blank to form a series of circumferential cuts on one face of each tooth of the blank, and in reversing the position of the blank to form a series of cuts, conforming to any predetermined angle relative to the plane of rotation of the blank, on the opposite side of each tooth of the blank.

6. The process of forming a milling cutter from a blank which consists in rotating the blank, in rotating a cutting wheel in engagement with the blank, in effecting feeding movements of the wheel relative to the blank along any predetermined angle relative to the plane of rotation of the blank to form a series of circumferential cuts on one face of each tooth of the blank, said feeding movements being effected in timed relation to the blank rotation, and in reversing the relative position of the blank and the wheel to form a series of cuts, conforming to any predetermined angle relative to the plane of rotation of the blank, on the opposite side of each tooth of the blank.

7. The process of forming a milling cutter from a blank which consists in rotating the blank, in rotating a cutting wheel in engagement with the blank, in effecting feeding movements of the wheel relative to the blank along any predetermined angle relative to the plane of rotation of the blank to form a series of circumferential cuts on one face of each tooth of the blank, in reversing the position of the blank and the wheel to form a series of cuts, conforming to any predetermined angle relative to the plane of rotation of the blank, on the opposite side of each tooth of the blank, and in feeding the wheel relative to the blank for effecting a series of cuts on the periphery of the blank to form a surface, conforming to any predetermined angle relative to the plane of rotation of the cutter blank, on each tooth between the side faces.

8. The process of forming a milling cutter from a blank which consists in continuously rotating the blank, in rotating a cutting wheel in a plane parallel to the axis of rotation of the blank to effect point engagement between the wheel and the blank, in effecting feeding movements of the wheel at any predetermined angle relative to the plane of rotation of the blank to produce a series of circumferential cuts on each tooth of the blank.

9. The process of forming a milling cutter from a blank which consists in continuously rotating the blank, in rotating a cutting wheel in a plane perpendicular to the plane of rotation of the blank, in effecting feeding movements of the wheel at any predetermined angle relative to the plane of rotation of the blank to produce a series of circumferential cuts on each tooth of the blank.

10. The process of forming a milling cutter from a blank which consists in rotating the blank, in rotating a cutting wheel in a plane perpendicular to the plane of rotation of the blank, in effecting feeding movements of the wheel at any predetermined angle relative to the plane of rotation of the blank and in timed relation to the blank rotation to produce a series of circumferential cuts on one face of each tooth of the blank, in reversing the relative position of the blank and the wheel to form a similar series of cuts on the opposite face of each tooth of the blank, and in effecting feeding movements of the wheel relative to the blank to form a surface on each tooth between the side faces.

11. The process of forming a milling cutter from a blank which consists in continuously rotating the blank, in rotating a cutting wheel in engagement with the blank, in effecting relative movement between the blank and the wheel to produce on one face of each tooth a series of relieved cuts which conform to the desired angle of the teeth of the blank, and in forming a similar series of cuts on the opposite face of each tooth.

12. The process of forming a milling cutter from a blank which consists in continuously rotating the blank, in rotating a cutting wheel in engagement with the blank, in effecting relative movement between the blank and the wheel to produce on one face of each tooth a series of relieved cuts which conform to the desired angle of the teeth of the blank, in forming a similar series of cuts on the opposite face of each tooth, and in effecting a series of relieved adjacent cuts on the periphery of the cutter to form relieved surfaces between the side faces of the teeth.

13. The process of forming a milling cutter from a blank which consists in rotating the blank, in rotating a cutting wheel in engagement with the blank, in effecting feeding movements of the wheel relative to the blank along any predetermined angle relative to the plane of rotation of the blank, in reciprocating the blank relative to the wheel to form a series of relieved cuts on each tooth of the blank, and in forming a similar series of cuts conforming to any desired angle on the opposite face of each tooth.

14. The process of forming a milling cutter from a blank which consists in rotating the blank, in rotating a cutting wheel in engagement with the blank, in effecting feeding movements of the wheel relative to the blank along any predetermined angle relative to the plane of rotation of the blank, in reciprocating the blank relative to the wheel to form a series of relieved cuts on each tooth of the blank, in reversing the relative position of the blank and the wheel to form a similar series of cuts, conforming to any predetermined angle relative to the plane of rotation of the blank, on the opposite side of each tooth of the blank, and in effecting a series of relieved adjacent cuts on the periphery of the blank to form a relieved surface, conforming to any angle relative to the plane of rotation of the blank, on each tooth between the side faces.

15. The process of forming a milling cutter from a blank which consists in rotating the blank, in rotating a cutting wheel in engagement with the blank, in effecting feeding movements of the wheel relative to the blank along any predetermined angle relative to the plane of rotation of the blank and in timed relation to the blank rotation, in reciprocating the blank relative to the wheel in timed relation to the blank rotation to form a series of relieved cuts on each tooth of the blank, in reversing the relative position of the blank and the wheel to form a similar series of cuts conforming to any predetermined angle relative to the plane of rotation of the blank on the opposite side of the blank, and in feeding the wheel relative to the blank for effecting a series of relieved circumferential cuts on the periphery of the blank to form a relieved surface on each tooth between the side faces and conforming to any predetermined angle relative to the plane of rotation of the blank.

16. The process of forming a milling cutter from a blank which consists in rotating the blank, in rotating a cutting wheel in a plane perpendicular to the plane of rotation of the blank, in effecting relieving movements of the blank relative to the wheel, and in effecting feeding movements of the wheel to produce a series of circumferential cuts on each tooth of the blank.

17. The process of forming a milling cutter from a blank which consists in rotating the blank, in rotating a cutting wheel in a plane perpendicular to the plane of rotation of the blank, in effecting relieving movements of the blank in timed relation to its rotation, in effecting feeding movements of the wheel at any predetermined angle relative to the plane of rotation of the blank to produce a series of circumferential cuts on each tooth of the blank.

18. The process of forming a milling cutter from a blank which consists in rotating the blank, in rotating a cutting wheel in a plane perpendicular to the plane of rotation of the blank, in effecting relieving movements of the blank in timed relation to its rotation, in effecting feeding movements of the wheel at any predetermined angle relative to the plane of rotation of the blank to produce a series of circumferential cuts on one face of each tooth of the blank, in reversing the relative position of the blank and the wheel to form a similar series of cuts on the opposite face of each tooth of the blank, and in effecting feeding movements of the wheel relative to the blank to form a surface on each tooth between the side faces.

In testimony whereof, I hereto affix my signature.

WILLIAM C. F. SCHRAMM.